(12) United States Patent
Smith (10) Patent No.: US 11,339,916 B2
(45) Date of Patent: May 24, 2022

(54) TRIPOD

(71) Applicant: Cade Smith, Gilbert, AZ (US)

(72) Inventor: Cade Smith, Gilbert, AZ (US)

(*) Notice: Subject to any disclaimer, the term of this patent is extended or adjusted under 35 U.S.C. 154(b) by 0 days.

(21) Appl. No.: 17/076,298

(22) Filed: Oct. 21, 2020

(65) Prior Publication Data

US 2021/0123561 A1    Apr. 29, 2021

Related U.S. Application Data

(60) Provisional application No. 62/926,229, filed on Oct. 25, 2019.

(51) Int. Cl.
| | | |
|---|---|---|
| *F16M 11/14* | (2006.01) | |
| *F16M 11/28* | (2006.01) | |
| *F16M 11/32* | (2006.01) | |
| *G03B 17/56* | (2021.01) | |

(52) U.S. Cl.
CPC ............ *F16M 11/14* (2013.01); *F16M 11/28* (2013.01); *F16M 11/32* (2013.01); *G03B 17/561* (2013.01)

(58) Field of Classification Search
CPC ........ F16M 11/14; F16M 11/28; F16M 11/32; F16M 11/36; F16M 11/34; F16M 2200/027; F16M 11/26; G03B 17/561; F16B 7/14; F16B 7/1418; F16B 7/1463; F16B 7/149
USPC ................... 248/125.7, 188.5, 166–173, 463
See application file for complete search history.

(56) References Cited

U.S. PATENT DOCUMENTS

| | | | | | |
|---|---|---|---|---|---|
| 1,464,308 | A | * | 8/1923 | Copony ................. | B23Q 1/545 403/374.5 |
| 1,780,383 | A | * | 11/1930 | Green .................... | F16M 11/14 403/114 |
| 1,831,086 | A | * | 11/1931 | Zerk ...................... | F16M 11/14 403/56 |
| 1,883,276 | A | * | 10/1932 | Zerk ...................... | F16M 11/32 403/123 |
| 1,894,456 | A | * | 1/1933 | Zerk ...................... | F16M 11/10 248/187.1 |
| 2,168,988 | A | * | 8/1939 | Hultquist ............... | F16M 11/28 248/181.1 |
| 2,180,214 | A | * | 11/1939 | Rapp .................. | F16M 11/2014 248/181.1 |
| 2,184,358 | A | * | 12/1939 | Moore .................... | F16B 7/149 403/109.5 |
| 2,430,649 | A | * | 11/1947 | Schulz ................... | F16M 11/32 248/188.5 |
| 2,453,817 | A | * | 11/1948 | Shalkhauser .......... | F16M 11/34 248/413 |

(Continued)

*Primary Examiner* — Christopher Garft
(74) *Attorney, Agent, or Firm* — Hartman Titus PLC; John D. Titus (57) ABSTRACT

A tripod combines a ball mount base with a tilt/pan head includes a ball stud that is attached to the center column of the tripod. A lockable ball mount is attached to the ball stud and a tilt/pan head is attached to the ball mount. The tilt/pan head thus can be leveled using the ball mount irrespective of the orientation of the tripod itself. The tripod may also have telescoping legs each with a friction lock. The friction locks have identical threads notwithstanding that each successive telescoping leg segment is smaller in diameter than the previous. A universal end cap can be attached to any one of the leg segments. Telescoping arms attached to the legs form a V-shaped cradle to support an item attached to the tripod head.

6 Claims, 6 Drawing Sheets

(56) References Cited

U.S. PATENT DOCUMENTS

| | | | | |
|---|---|---|---|---|
| 2,503,997 | A | * | 4/1950 | Leo ................. F16M 11/32 248/188.5 |
| 2,508,122 | A | * | 5/1950 | Mooney ............. F16M 11/16 248/404 |
| 2,518,877 | A | * | 8/1950 | Gauff ................ A47B 97/08 248/463 |
| 2,550,415 | A | * | 4/1951 | Kammermeyer ...... F16M 11/10 248/183.1 |
| 2,672,313 | A | * | 3/1954 | Poole ................ F16M 11/14 403/115 |
| 2,763,456 | A | * | 9/1956 | Breer ................. F16M 11/08 248/188.4 |
| 2,883,875 | A | * | 4/1959 | Davidson ............. F16M 11/242 74/DIG. 10 |
| 3,211,405 | A | * | 10/1965 | Fey .................... F16M 11/16 248/168 |
| 3,419,293 | A | * | 12/1968 | Conrad ............... F16B 7/1427 285/302 |
| 3,863,945 | A | * | 2/1975 | Dunstan ............... F16M 11/42 280/47.131 |
| 4,121,799 | A | | 10/1978 | Michio |
| 4,192,076 | A | * | 3/1980 | Hall .................... G01P 15/08 248/524 |
| 4,277,197 | A | * | 7/1981 | Bingham ............. F16B 7/149 403/104 |
| 4,339,880 | A | * | 7/1982 | Hall .................... F16M 11/16 248/163.1 |
| 4,453,446 | A | * | 6/1984 | Hoshino ............... G10D 13/28 984/150 |
| 4,570,887 | A | * | 2/1986 | Banister .............. F16M 11/10 248/223.41 |
| 4,687,309 | A | * | 8/1987 | Breslau ............... F16M 11/28 396/423 |
| 4,796,508 | A | * | 1/1989 | Hoshino ............... G10D 13/02 84/421 |
| 4,826,125 | A | * | 5/1989 | Kelley ................. A47B 97/08 248/463 |
| 5,011,104 | A | * | 4/1991 | Fang .................. F16M 11/28 248/161 |
| 5,029,795 | A | * | 7/1991 | Dexter ................. F16M 11/041 248/431 |
| 5,510,863 | A | | 4/1996 | Kliewer |
| 5,632,459 | A | | 5/1997 | Brett |
| 5,725,187 | A | * | 3/1998 | Vo ....................... F16M 11/32 396/428 |
| 6,007,259 | A | * | 12/1999 | Mori .................... F16M 11/10 396/428 |
| 6,352,228 | B1 | * | 3/2002 | Buerklin ............... F16C 11/106 248/288.51 |
| 6,520,192 | B1 | * | 2/2003 | Lo ...................... A45B 19/04 403/109.5 |
| 7,100,881 | B2 | * | 9/2006 | Worrall ............... F16M 11/2078 403/115 |
| 7,229,053 | B2 | | 6/2007 | Speggiorin |
| 7,290,740 | B2 | | 11/2007 | Joy et al. |
| 7,300,028 | B2 | | 11/2007 | Vogt |
| 7,604,207 | B2 | | 11/2009 | Hasloecher et al. |
| 8,282,055 | B2 | | 11/2012 | Burklin |
| 8,858,097 | B2 | | 10/2014 | Hale |
| 9,016,645 | B2 | * | 4/2015 | Simpson ............. H04R 1/026 248/292.12 |
| 9,694,455 | B2 | | 7/2017 | Brown et al. |
| 10,353,103 | B1 | * | 7/2019 | Olsson ................ F16M 11/041 |
| 10,422,469 | B2 | | 9/2019 | Clark |
| 10,808,880 | B1 | * | 10/2020 | Gearing ............... F16M 11/14 |
| 10,856,629 | B1 | * | 12/2020 | Unice ................... A45B 1/00 |
| 10,871,371 | B1 | * | 12/2020 | Devereux ............ F16M 13/022 |
| 2003/0042388 | A1 | * | 3/2003 | Peterson .............. F16M 13/06 D22/199 |
| 2005/0082444 | A1 | * | 4/2005 | Raynaud ............. F16M 11/2078 248/171 |
| 2007/0075209 | A1 | * | 4/2007 | Kapp ................... F16M 11/34 248/460 |
| 2007/0090237 | A1 | * | 4/2007 | Hsu ..................... F16M 11/14 248/177.1 |
| 2008/0253600 | A1 | * | 10/2008 | Wetzel ................ F16M 11/28 381/362 |
| 2010/0019109 | A1 | * | 1/2010 | Liu ...................... F16M 11/16 248/188 |
| 2010/0172643 | A1 | * | 7/2010 | Sudhana .............. F16C 11/106 396/428 |
| 2011/0036960 | A1 | * | 2/2011 | Li ........................ F16C 11/106 248/288.11 |
| 2013/0092203 | A1 | * | 4/2013 | Zaltron ................ A63C 11/221 403/109.1 |
| 2013/0313384 | A1 | * | 11/2013 | Nakatani .............. F16M 11/32 248/178.1 |
| 2014/0144351 | A1 | * | 5/2014 | Schindler ............. F16M 13/02 108/42 |
| 2016/0061377 | A1 | * | 3/2016 | Nakatani .............. F16M 11/242 248/184.1 |
| 2016/0077412 | A1 | * | 3/2016 | Nakatani .............. F16M 11/26 403/377 |
| 2016/0169420 | A1 | * | 6/2016 | Hu ....................... F16M 11/32 138/155 |
| 2016/0258572 | A1 | * | 9/2016 | Ben Meir ............. G03B 17/561 |
| 2017/0016466 | A1 | * | 1/2017 | Kim ..................... F16B 7/149 |
| 2017/0045180 | A1 | * | 2/2017 | Schaeffer ............ F16M 11/046 |
| 2017/0146891 | A1 | * | 5/2017 | Chen ................... G03B 17/561 |
| 2017/0198857 | A1 | * | 7/2017 | Thomas ............... B65D 29/00 |
| 2018/0187830 | A1 | * | 7/2018 | Gearing ............... F16M 11/26 |
| 2020/0103196 | A1 | * | 4/2020 | Keller .................. F16M 11/041 |
| 2020/0116296 | A1 | * | 4/2020 | Dunn ................... F16M 11/16 |
| 2020/0187633 | A1 | * | 6/2020 | Paratore .............. A46B 5/005 |
| 2020/0217447 | A1 | * | 7/2020 | Johnson, Sr. ......... F16M 11/32 |
| 2020/0240577 | A1 | * | 7/2020 | Li ........................ G03B 17/561 |
| 2020/0292125 | A1 | * | 9/2020 | Collins ................. F16M 11/28 |
| 2020/0375331 | A1 | * | 12/2020 | Baccellieri ........... A45C 15/00 |
| 2021/0080050 | A1 | * | 3/2021 | Johnson, Sr. ......... F16M 11/041 |
| 2021/0088303 | A1 | * | 3/2021 | Amaral ................ F16M 11/36 |
| 2021/0123561 | A1 | * | 4/2021 | Smith .................. F16M 11/28 |

* cited by examiner

TRIPOD

BACKGROUND OF THE INVENTION

This invention relates generally to tripods, and in particular to tripods for supporting a camera, surveyor transit, firearm or other weapon utilizing a stock.

Tripods, of the type typically used to support a camera, surveyor transit, or firearm are well known. Such tripods typically have three legs supporting a center column support or spider, which in turn, supports a center column on which is attached the tripod head. Tripod heads typically are one of two varieties, a tilt/pan head or a ball head. Tilt/pan heads have an advantage in that they can be panned smoothly in a plane to follow the movement of the subject being followed, especially if the tilt/pan head is counterbalanced or equipped with a damping mechanism such as a hydraulic damper. Tilt/pan heads are disadvantaged, however, because in order to level the head, the legs of the tripod themselves must be leveled, which can be a slow and cumbersome iterative process. Ball heads have an advantage in that they can be quickly moved to the desired orientation and locked in place. Ball heads are disadvantaged, however, because they move freely in any axis and therefore do not maintain a consistent plane when being moved as does a tilt/pan head.

Prior art tripods additionally have a disadvantage in that the sections of the telescoping legs often cannot be removed. Therefore, these tripods are unnecessarily heavy if the intended use does not require the tripod to be used with the legs extended. Moreover, even if the sections of the telescoping legs can be removed, removal of the leg sections leaves an open hole at the bottom of the legs where dirt can enter. The unprotected ends of the legs can also be damaged. Finally, prior art tripods do not have multiple arms extending from the middle of the leg assemblies which can be attached together to form a cradle behind the tripod head.

SUMMARY OF THE INVENTION

The present invention comprises a tripod that combines a ball mount base with a tilt/pan head. According to an illustrative embodiment a ball stud is attached to the center column of the tripod. A ball mount having a spherical chamber is attached to the spherical portion of the ball stud. A tilt/pan head is attached to the ball mount. The spherical chamber of the ball mount can be opened to allow the ball mount to swivel around the ball stud or clamped shut to grip the ball stud. This allows the tilt/pan head to be leveled irrespective of the orientation of the tripod itself. According to the illustrative embodiment, the tripod has telescoping legs each with a friction lock. The friction locks have identical threads notwithstanding that each successive telescoping leg segment is smaller in diameter than the previous. Because the threads are identical, any number of leg segments can be removed and a universal end cap assembled to the leg segments that remain attached to the tripod. The tripod may also incorporate a Vee shaped cradle attached to two of the legs.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 1:
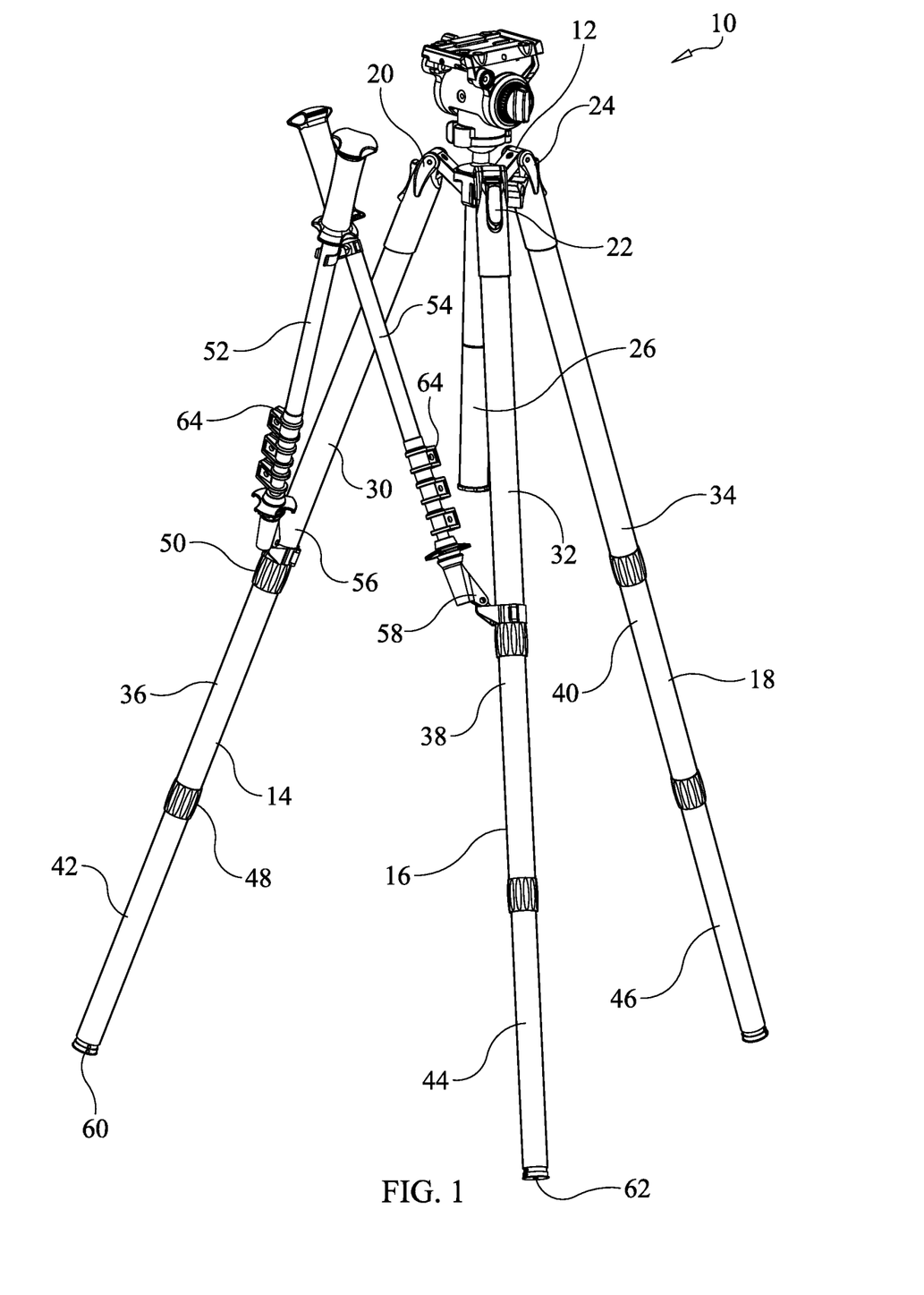
FIG. 1 is a perspective view of a tripod incorporating features of the present invention.
Figure 2:
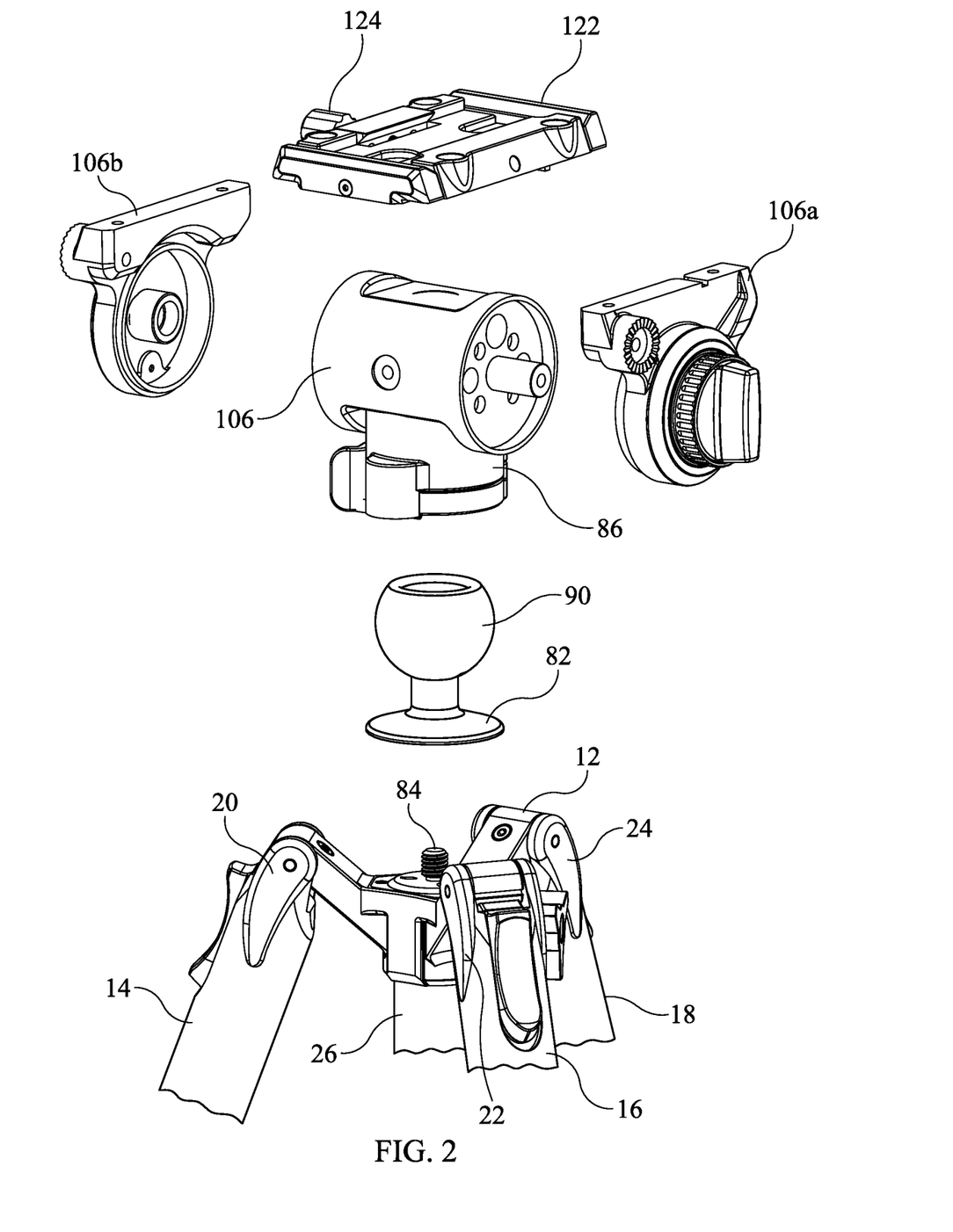
FIG. 2 is an exploded perspective view of a portion of the tripod of FIG. 1.

With reference to the figures and in particular FIG. 1 and FIG. 2, a tripod 10 incorporating features of the present invention comprises a center column support 12. Leg assemblies 14, 16, 18 are pivotally attached to center column support 12 at their respective upper ends 20, 22, and 24. Center column support 12 supports a center column 26 which may be a single or a multiple-segment column that has a sliding engagement with an aperture in column support 12. Center column 26 may be raised or lowered in a conventional manner and locked in place with thumb screw 28 (shown most clearly in FIG. 3).

In the illustrative embodiment, leg assemblies 14, 16, and 18 each comprise an upper section 30, 32 and 34, a middle section 36, 38, and 40, and a lower section 42, 44, and 46. Lower section 42 telescopes inside middle section 36 and can be locked in place in the fully extended, fully retracted or any intermediate position by means of a friction lock 48. Similarly, middle section 36 telescopes inside upper section 30 and can be locked in place in the fully extended, fully retracted or any intermediate position by means of a friction lock 50. Although in the illustrative embodiment leg assemblies 14, 16 and 18 each comprise three sections, leg assemblies comprising greater than or fewer than three leg segments are considered within the scope of the invention. The details of the unique friction locks of the present invention will be discussed more fully hereinafter.

Figure 4:
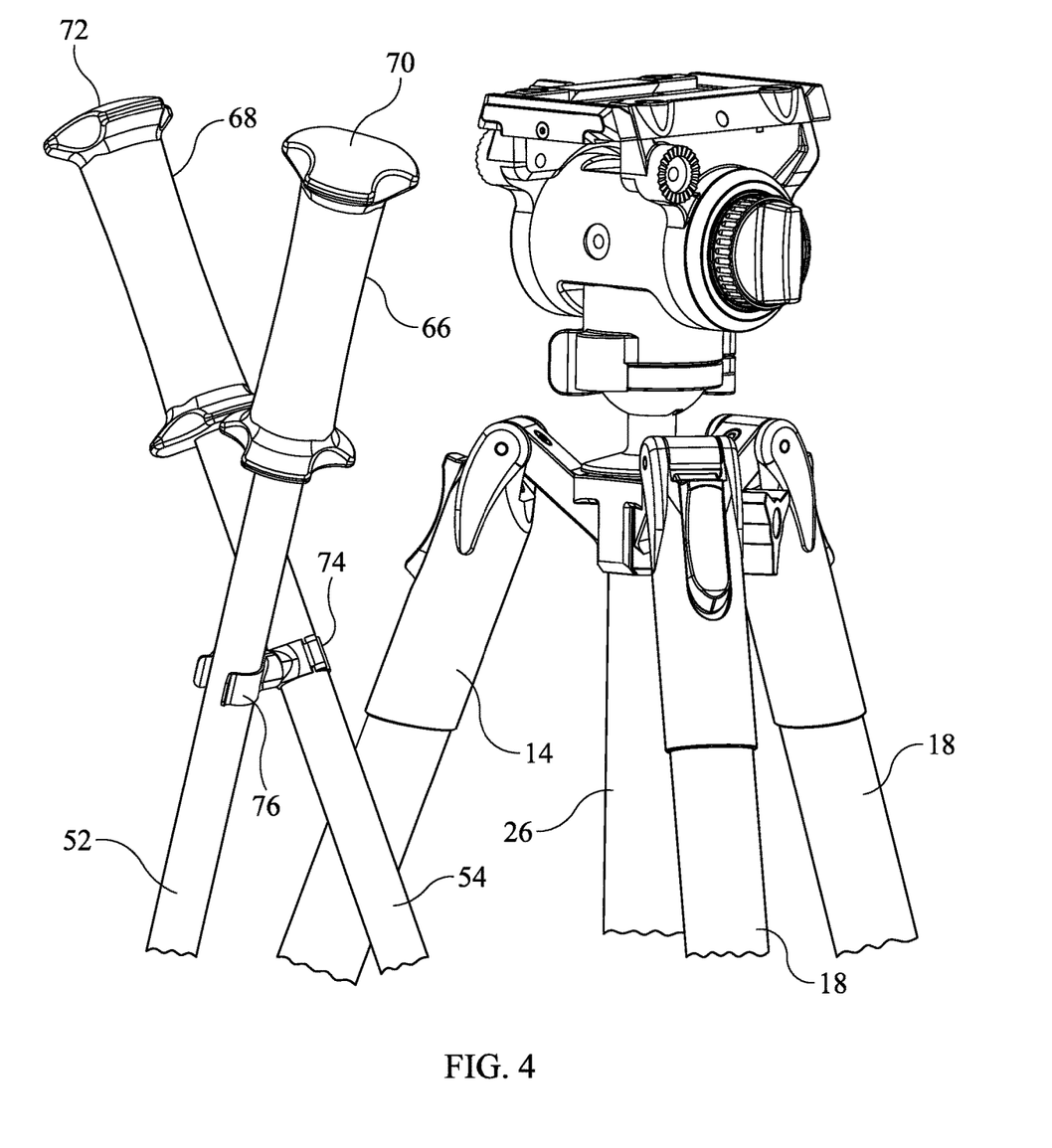
FIG. 4 is an enlarged perspective view of another portion of the tripod of FIG. 1.

A pair of telescoping arms 52 and 54 are attached to leg assemblies 14 and 16 by means of hinges 56 and 58 which are attached to leg assemblies 14 and 16 at a location disposed between upper ends 20, 22 and lower ends 60, 62 of leg assemblies 14 and 16. Telescoping arms 52 and 54 telescope in a conventional manner and can be locked in place with conventional friction locks or cam locks such as cam lock 64. With additional reference to FIG. 4, the free ends 66 and 68 of telescoping arms 52 and 54 may include padded handles 70 and 72 which enable telescoping arms 52 and 54 to be used as hiking poles when detached from tripod 10. A fastener assembly 74 attaches telescoping arm 52 to telescoping arm 54 proximate to the free ends 66 and 68. Fastener assembly 74 can be any fastener or other means of attaching two articles together, however, in the illustrative embodiment fastener assembly 74 comprises a spring clip 76 which is clamped to telescoping arm 54 and which clips to telescoping arm 52. Spring clip 76 includes a rotating union between the clamp and the clip so that the clip fully engages telescoping arm 52 irrespective of the angle of contact. When clipped together, telescoping arm 52 and telescoping arm 54 form a very stable cradle which can be used to support the butt of a rifle or any long item attached to the tripod head needing additional support.

Figure 3:
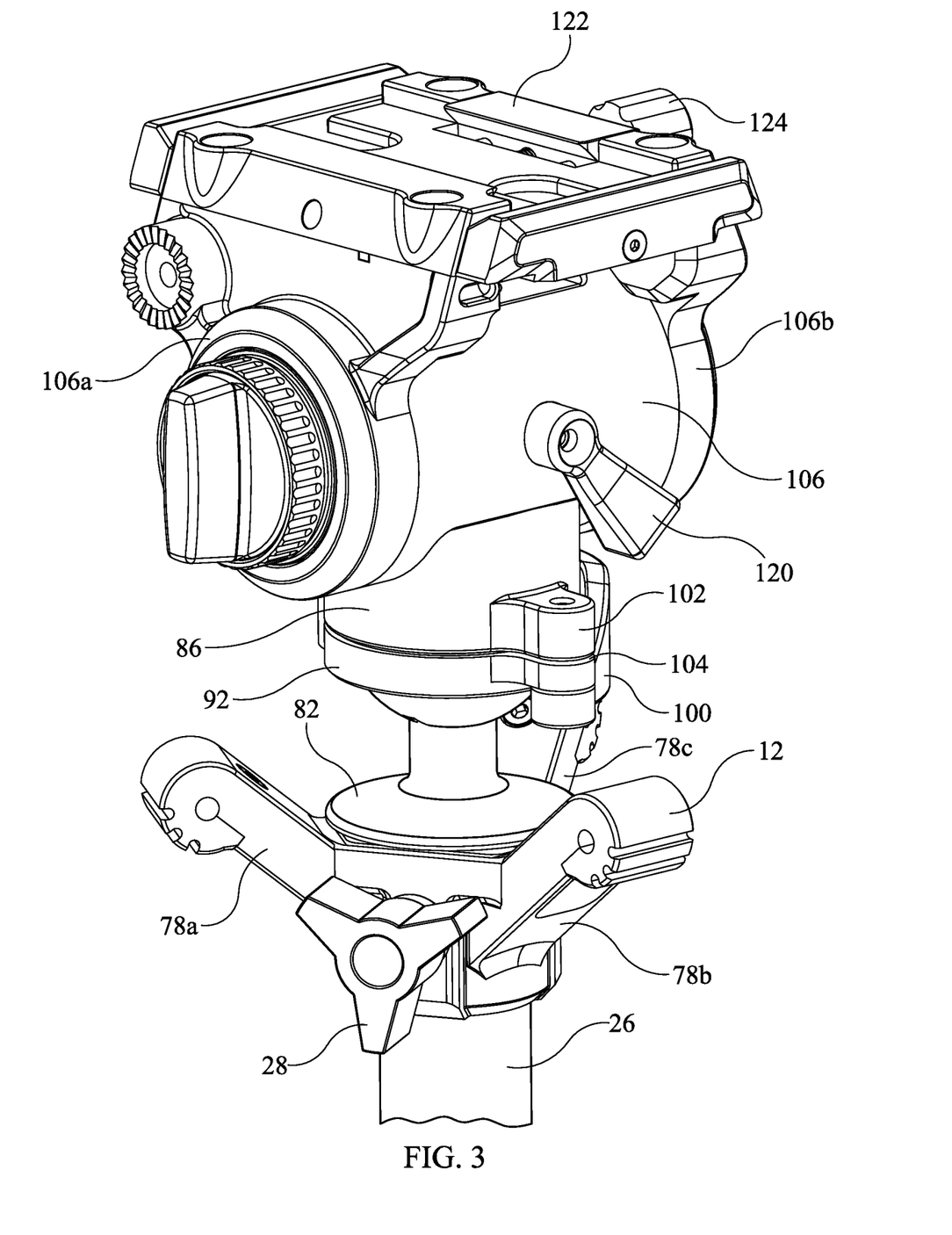
FIG. 3 is an enlarged perspective view of a portion of the tripod of FIG. 1.
Figure 5:
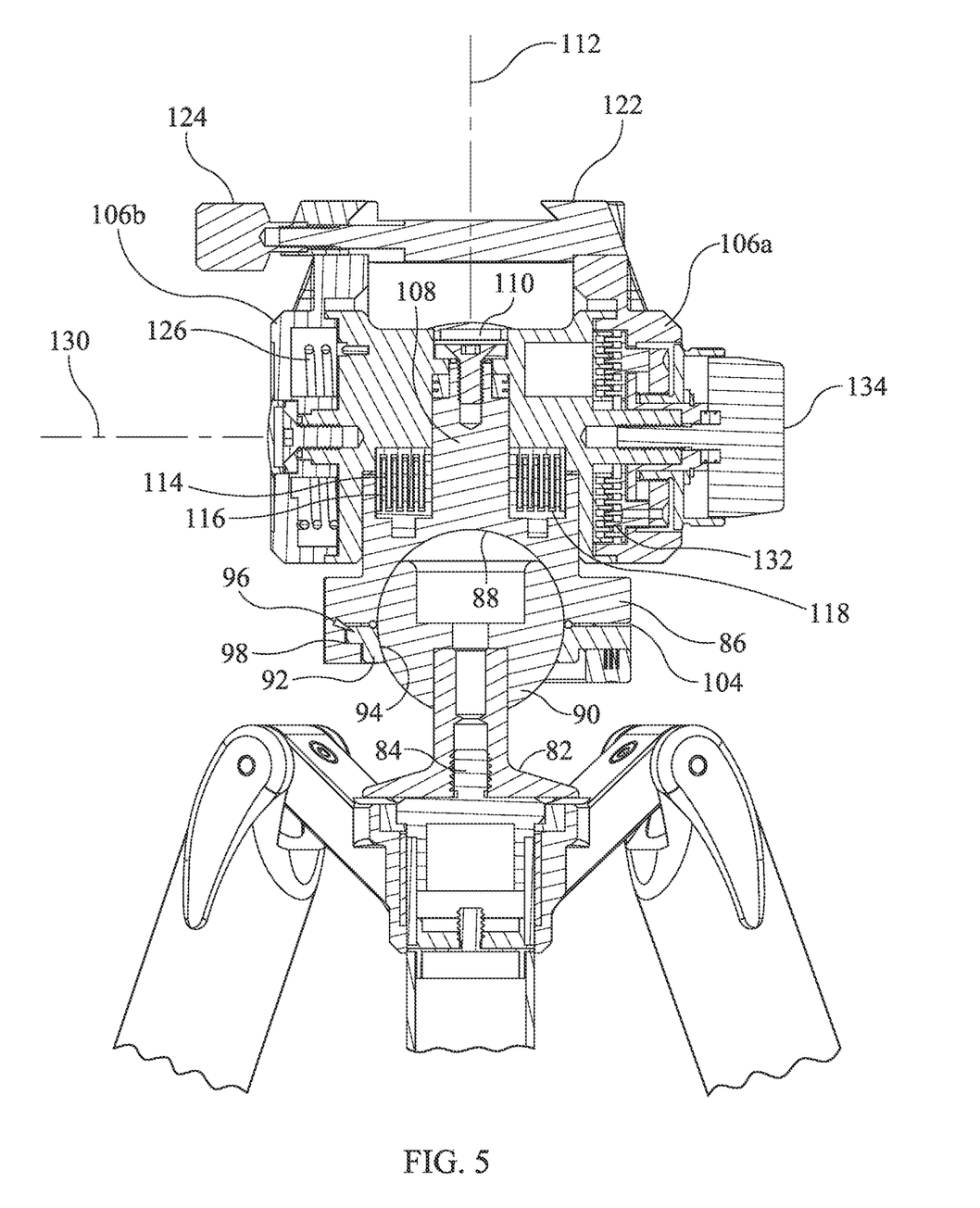
FIG. 5 is a cross-sectional view of a portion of the tripod of FIG. 1.

With particular reference to FIG. 2, FIG. 3 and FIG. 5, the unique tripod head 80 in accordance with the present invention comprises a ball stud 82 which, in the illustrative embodiment, is attached to center column 26 by means of threaded stud 84, although the ball stud 82 may also be attached directly to center column support 12 in applications where tripod 10 does not have a moveable center column to save weight. Center column support 12 has mounting arms 78A, 78B and 78C which extend upwardly from the center portion of column support 12 where center column 26 is attached. This enables center column support 12 to be placed low to the ground without leg assemblies 14, 16, and 18 being completely horizontal and therefore unstable.

Ball mount 86 comprises a spherical chamber 88 which is sized to receive the spherical portion 90 of ball stud 82. Ball clamp 92 has an upwardly facing spherical surface 94 that engages spherical portion 90 of ball stud 82 and a tongue portion 96 engages a groove 98 formed in ball mount 86. This allows ball clamp 92 to pivot towards and away from spherical portion 90 of ball stud 82. In the illustrative embodiment, a lever 100 is threaded into a boss 102 of ball mount 86. Movement of lever 100 opens and closes the gap 104 between ball clamp 92 and ball mount 86 which allows ball mount 86 to be moved in multiple degrees of freedom around ball stud 82 then locked in position by tightening lever 100. Although in the illustrative embodiment ball clamp 92 is tightened by means of a lever 100, other methods of closing gap 104 with a high mechanical advantage, for example by means of a thumbscrew, are considered within the scope of the invention.

Tilt housing 106, 106A, 106B is attached to upper portion 108 of ball mount 86 by means of a recessed screw 110 so that it freely rotates about vertical axis 112. A hydraulic damper 114 comprising a series of interlaced cylindrical fingers 116 extending upward from ball mount 86 and a series of interlaced cylindrical fingers 118 extending downward from tilt housing 106 provides motion damping when tilt housing 106 is swiveled about axis 112. Tilt housing 106 may be locked to prevent it from being swiveled about axis 112 by means of pan lock lever 120. Tilt housing 106 further includes a mounting base 122 which, in the illustrative embodiment comprises a conventional dovetail mount which may be opened and closed by means of thumbscrew 124 to attach a camera, a surveyor transit, scope or other optics, or preferably a rifle clamp such as the rifle clamp disclosed in U.S. Pat. No. 9,206,941, the contents of which are incorporated herein by reference. Tilt housing 106 may include a counterweight spring 126 which works to counterbalance the weight of an object mounted to mounting base 122 when mounting base 122 is tilted around axis 130. A hydraulic damper 132 comprising a series of interlaced fingers similar to hydraulic damper 114 provides motion damping when mounting base 122 is tilted around axis 130. Tilt housing 106 can be locked to prevent tilting around axis 130 by tightening tilt lock knob 134. The unique combination of ball stud 82 ball mount 86 and tilt housing 106 allows tripod 10 to be placed on uneven or sloping ground without the need to adjust the legs independently to level mounting base 122. Instead, irrespective of the orientation of center column support 12 and center column 26, mounting base 122 can be leveled by unlocking ball clamp 92 and rotating mounting base 122 until it is level. Afterwards, tilt housing 106 can be used to tilt mounting base 122 vertically and/or pan mounting base 122 horizontally (or along an inclined axis if desired) without regard to the orientation of the rest of tripod 10. Incorporation of a bubble level into mounting base 122 (as opposed to incorporating a bubble level into center column support 12) facilitates leveling of just the mounting base 122 rather than the entire tripod 10.

Figure 6:
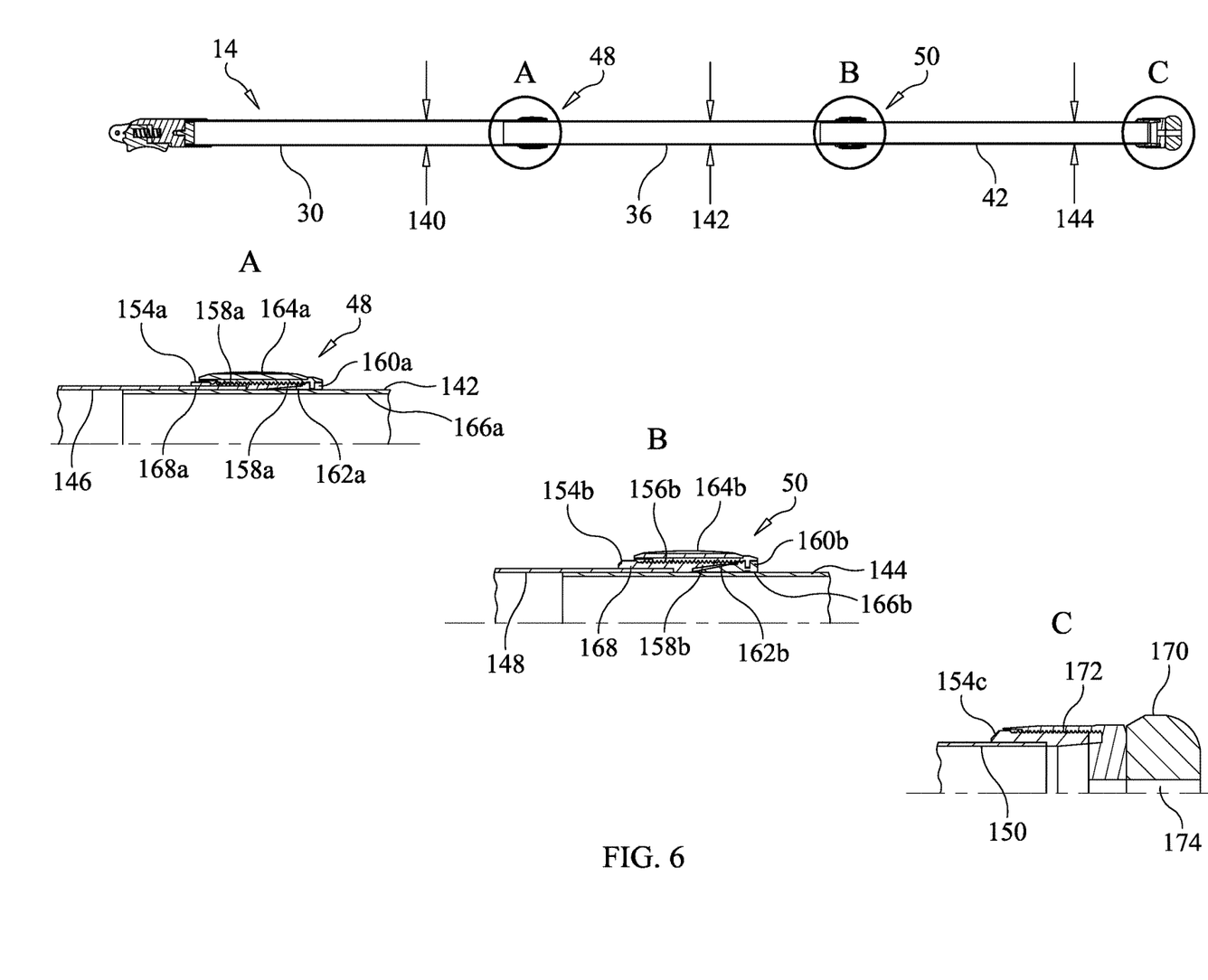
FIG. 6 is a cross-sectional view of an illustrative leg assembly of the tripod of FIG. 1.

With additional reference to FIG. 6. As noted above, lower section 42 of leg assembly 14 telescopes inside middle section 36 and can be locked in place in the fully extended, fully retracted or any intermediate position by means of a friction lock 50. Similarly, middle section 36 telescopes inside upper section 30 and can be locked in place in the fully extended, fully retracted or any intermediate position by means of a friction lock 48. Upper section 30 has an outside diameter 140. Middle section 36 has an outside diameter 142 and lower section 42 has an outside diameter 144. Upper section 30 has an inside diameter 146 which is slightly larger than outside diameter 142 of middle section 36 so that middle section 36 telescopes smoothly inside of upper section 30. Similarly, middle section 36 has an inside diameter 148 which is slightly larger than outside diameter 144 of lower section 42 so that lower section 42 telescopes smoothly inside of middle section 36. Lower section 42 also has an inside diameter 150 to accommodate additional telescoping sections (not shown).

Friction lock 48 comprises a tube cap 154A which is rigidly attached to upper section 30. Tube cap 154A includes external threads 156A, which may be any convenient size, but in the illustrative embodiment comprise 1.25"-24 UN male threads. Tube cap 154A further includes an inclined conical surface 158A the purpose of which will be described hereinafter. Locking collar 160A has a conical surface 162A which engages inclined conical surface 158A of tube cap 154A. A knurled nut 164A has female threads than engage external threads 156A so that when knurled nut 164A is tightened, conical surface 158A is forced against inclined conical surface 158A. This causes locking collar 160A to squeeze down on the outside diameter 142 of middle section 36 locking it in place. Similarly, Friction lock 50 comprises a tube cap 154B which is rigidly attached to middle section 36. Tube cap 154B includes external threads 156B which are the same e.g. 1.25"-24 UN thread size as external threads as external threads 156A. Tube cap 154B further includes an inclined conical surface 158B having a similar function as inclined conical surface 158A. Locking collar 160B has a conical surface 162B which engages inclined conical surface 158B of tube cap 154B. Knurled nut 164B has female threads than engage external threads 156B so that when knurled nut 164B is tightened, conical surface 158B is forced against inclined conical surface 158B. This causes locking collar 160B to squeeze down on the outside diameter 144 of lower section 42 locking it in place.

Because the outside diameter 142 of middle section 36 is inherently larger than outside diameter 144 of lower section 42, the inside diameter 166A of locking collar 160A will be larger than the inside diameter 166B of locking collar 160B. For similar reasons, the inside diameter 168A of tube cap 154A will be larger than the inside diameter 168B of tube cap 154B. The threads 156 A and 156B, however, are the same and therefore tube cap 154B will have a thicker cross-section then tube 154A. Having a consistent external thread size however enables an end fitting such as foot 170 to have an internal thread 172 that can attach directly to tube cap 154A, tube cap 154B, or tube cap 154C (or additional tube caps if additional leg sections are employed). Foot 170 may have a solid end, or may have a center bore 174 to accept a ground spike or similar device. Leg assemblies 16 and 18 operate in substantially the same manner and therefore will not be discussed in detail herein Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term ______ is defined to mean ______")

What is claimed is:

1. A tripod for supporting an apparatus comprising
   a center column support;
   a head assembly comprising a rigid base and a support surface for supporting the apparatus, the head assembly further comprising a first pivot axis and a second pivot axis connecting the support surface to the base, the second pivot axis being orthogonal to the first pivot axis whereby the support surface is movable about the first pivot axis to tilt the support surface relative the base and is moveable about the second pivot axis to swivel the support surface relative to the base; and
   a spherical joint having multiple degrees of freedom attaching the base of the head assembly to the center column support;
   a plurality of leg assemblies attached to the center column support, the plurality of legs each comprising telescoping legs which are capable of being locked in a retracted, extended, or partially extended position, each of the telescoping legs comprising a first section and a second section, each of the first and second sections having an open lower end, the first section having a first inside diameter and a first outside diameter, the second section having a second inside diameter and a second outside diameter, the second outside diameter being smaller than the first inside diameter whereby the second section telescopes inside the first section;
   a first friction lock, the first friction lock comprising a first fitting attached to the outside diameter of the first section proximal a lower end thereof, the first fitting having first external threads and a nut having internal threads that engage the first external threads to squeeze the first section inward to lock the second section in place, the outside diameter of the first section and the first external threads defining a first wall thickness;
   a second friction lock, the second friction lock comprising a second fitting attached to the outside diameter of the second section proximal a lower end thereof, the second fitting having second external threads to squeeze the second section inward, the outside diameter of the second section and the second external threads defining a second wall thickness;
   the second external threads being the same thread size as the first external threads whereby the wall thickness of the second friction lock is greater than the wall thickness of the first friction lock; and
   a cap having internal threads that are the same thread size as the first external threads, whereby the cap can be directly threaded to the first friction lock or the second friction lock.

2. The apparatus of claim 1, wherein the telescoping legs further comprise:
   a third section, the third section having a third inside diameter and
   a third outside diameter, the third outside diameter being smaller than the second inside diameter whereby the third section telescopes inside the second section; and
   a third friction lock, the third friction lock comprising a third fitting attached to the outside diameter of the third section proximal a lower end thereof, the third fitting having third external threads and a nut having internal threads that engage the third external threads to squeeze the third section inward, the outside diameter of the third section and the third external threads defining a second wall thickness;
   the third external threads being the same thread size as the first external threads
   whereby the cap can be threaded directly to the third section.

3. The apparatus of claim 1, wherein:
   the center column support has mounting arms which extend radially outward and upward from a center portion of the column support.

4. The apparatus of claim 1, further comprising:
   a center column having an upper end and a lower end, the center column passing substantially vertically through the center column support, the center column being moveable between a retracted and an extended position.

5. An improved tripod of the type having a center column support, a center column attached the center column support, and a moveable head assembly operatively attached to the center column for supporting an apparatus the improvement comprising:
   a plurality of leg assemblies, the plurality of leg assemblies comprising telescoping legs which are capable of being locked in a retracted, extended, or partially extended position, each of the telescoping legs comprising at least an upper section, a middle section and a lower section each section having a top end and a bottom end, the upper section comprising a hollow cylindrical tube having a first outer diameter and an first inner diameter, the middle section comprising a hollow cylindrical tube having a second outer diameter and a second inner diameter, the second outer diameter being smaller than the first inner diameter; the lower section comprising a cylindrical body having a third outer diameter, the third outer diameter being smaller than the second inner diameter;
   a first friction lock disposed at the bottom end of the upper section, the first friction lock comprising a first tube cap attached to the bottom end of the upper section, a first locking collar and a first nut, the first tube cap comprising first external threads and a first internal tapered surface, the first locking collar having a first external tapered surface that engages the first internal tapered surface of the tube cap, the first locking collar further comprising a first interior surface that slidingly engages the second outer diameter, the first nut having internal threads that match the first external threads, the first nut threadingly engaging the first external threads to force engagement between the first locking collar and the first tube cap, whereby the first locking collar is squeezed against the middle section to lock it in place;

a second friction lock disposed at the bottom end of the upper section, the second friction lock comprising a second tube cap attached to the bottom end of the middle section, a second locking collar and a second nut, the second tube cap comprising second external threads having a thread profile identical to the predetermined threads of the first friction lock, and a second internal tapered surface, the second locking collar having a second external tapered surface that engages the second internal tapered surface of the tube cap, the second locking collar further comprising a second interior surface that slidingly engages the third outer diameter, the second nut having internal threads that match the second internal threads, the second nut threadingly engaging the second external threads to force engagement between the second locking collar and the second tube cap, whereby the second locking collar is squeezed against the lower section to lock it in place; and a cap having internal threads that match the first and second external threads, whereby the cap can be directly attached to the upper section or the middle section.

6. The apparatus of claim 5, wherein the plurality of leg assemblies comprises:

first and second leg assemblies each having an upper end and a lower end, the upper ends of the first and second leg assemblies being attached to the center column support, the lower ends of the first and second leg assemblies adapted to support the tripod on a solid surface;

first and second arm assemblies each having a fixed end and a free end, the fixed end of the first arm assembly being pivotally attached to the first leg assembly intermediate the upper and lower end thereof, the fixed end of the second arm assembly being pivotally attached to the second leg assembly intermediate the upper and lower end thereof; and a fastener assembly disposed proximal the free ends of the first and second arm assemblies, the fastener assembly attaching the first arm to the second arm, whereby the first arm and the second arm form an upright V-shaped cradle.

* * * * *